(12) United States Patent
In 'T Panhuis et al.

(10) Patent No.: US 10,240,455 B2
(45) Date of Patent: Mar. 26, 2019

(54) METHOD AND SYSTEM FOR MONITORING FLUID FLOW IN A CONDUIT

(71) Applicant: SHELL OIL COMPANY, Houston, TX (US)

(72) Inventors: Petrus Hendrikus Maria Wilhemus In 'T Panhuis, Rijswijk (NL); Johannis Josephus Den Boer, Rijswijk (NL); Roel Marie Kusters, Rijswijk (NL); Dayeeta Roy, Rijswijk (NL); Daria Mustafina, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 217 days.

(21) Appl. No.: 15/032,101

(22) PCT Filed: Oct. 27, 2014

(86) PCT No.: PCT/US2014/062324
§ 371 (c)(1),
(2) Date: Apr. 26, 2016

(87) PCT Pub. No.: WO2015/065869
PCT Pub. Date: May 7, 2015

(65) Prior Publication Data
US 2016/0265345 A1 Sep. 15, 2016

(30) Foreign Application Priority Data
Oct. 28, 2013 (EP) .................................... 13190463

(51) Int. Cl.
*E21B 47/10* (2012.01)
*E21B 47/12* (2012.01)
(Continued)

(52) U.S. Cl.
CPC .......... *E21B 47/101* (2013.01); *E21B 47/102* (2013.01); *E21B 47/123* (2013.01);
(Continued)

(58) Field of Classification Search
CPC .... E21B 47/101; E21B 47/102; E21B 47/123; G01F 1/7086; G01H 9/004; G01V 2210/1429
See application file for complete search history.

(56) References Cited

U.S. PATENT DOCUMENTS 6,378,380 B1    4/2002   Kusters et al.
8,315,486 B2 *  11/2012  Pearce .................... G01V 8/16
                                                      250/268

(Continued)

FOREIGN PATENT DOCUMENTS

WO    2013045941    4/2013

OTHER PUBLICATIONS

Mckinley, R.M., et al., McKinley, R.M., et al.: "The Structure and Interpretation of Noise From Flow Behind Cemented Casing", Journal of Petroleum Technology, vol. 25, No. 03 1973, pp. 329-338, XP002722015, ISSN: 0149-2136, DOI: http://dx.doi.org/10.2118/3999-PA Retrieved from the Internet: URL:https://www.onepetro.org/journal-paper/SPE-3999-PA. [retrieved on Mar. 19, 2014].

*Primary Examiner* — Elias Desta

(57) ABSTRACT

A method for monitoring fluid flow in a conduit comprises:
acoustically coupling an optical fiber to the conduit adjacent one or more flow restrictions ($R_1$-$R_4$) in the conduit;
inducing a Distributed Acoustic Sensing (DAS) assembly to measure an acoustic noise signature ($SNR_{1-4}$) generated in the fiber by the fluid flowing through each flow restriction ($R_1$-$R_4$);

(Continued)

deriving the fluid flow rate of the fluid ($Q_I$, $Q_{I+II}$) flowing through each flow restriction ($R_1$-$R_4$) from the measured acoustic noise signature ($SNR_{1-4}$); and displaying the derived fluid flow rate ($Q_I$, $Q_{I+II}$) at a fluid flow rate monitoring display.

15 Claims, 3 Drawing Sheets

(51) Int. Cl.
    *G01F 1/708*     (2006.01)
    *G01H 9/00*     (2006.01)

(52) U.S. Cl.
    CPC ........... *G01F 1/7086* (2013.01); *G01H 9/004* (2013.01); *G01V 2210/1429* (2013.01)

(56) References Cited

U.S. PATENT DOCUMENTS

| | | | |
|---|---|---|---|
| 8,997,585 B2 * | 4/2015 | Hayward | E21B 47/123 73/861.27 |
| 9,435,189 B2 | 9/2016 | Phillips et al. | |
| 2003/0121335 A1 | 7/2003 | Liu et al. | |
| 2007/0295101 A1 * | 12/2007 | Johansen | G01F 1/7082 73/861.04 |
| 2009/0037113 A1 | 2/2009 | Akram et al. | |
| 2009/0294123 A1 | 12/2009 | Mescall et al. | |
| 2011/0214498 A1 | 9/2011 | Rezgui et al. | |
| 2012/0277995 A1 | 11/2012 | Hartog et al. | |

* cited by examiner

METHOD AND SYSTEM FOR MONITORING FLUID FLOW IN A CONDUIT

BACKGROUND OF THE INVENTION

The invention relates to a method and system for monitoring fluid flow in a conduit.

A variety of flowmeters is currently available to monitor fluid flow in a conduit. Many existing flowmeters are costly pieces of equipment that are difficult to install in a confined space, such as downhole in an oil and/or gas production or in a fluid injection well.

It is known from U.S. Pat. No. 6,378,380 to monitor in such case fluid flow by measuring a pressure difference across a flow restriction in the conduit. However, the installation and calibration of such a flowmeter in an oil and/or gas production or in a fluid injection well is still a complex and costly operation.

A further disadvantage of existing in-well venturi flowmeters is that delta-P ($\Delta p$) sensors are not available for downhole use and that therefore absolute pressure gauges to be installed upstream and downstream of each venturi meter. The consequence is that to derive at a downhole delta-P ($\Delta p$) measurement two large numbers have be subtracted which is a large source of inaccuracy.

To reduce this inaccuracy, usually a downhole venturi is usually designed with a large beta (i.e. a small inner diameter) to increase the pressure drop ($\Delta p$). The large pressure drop ($\Delta p > 1$ bar) inhibits the fluid flux and the small inner diameter of the venturi may prevent logging tools to pass the venturi. To permit use of a venturi with a relatively large inner diameter to measure a relatively small delta-P, which requires selection of highly sensitive pressure gauges (like quartzdyne gauges), which are very expensive. Furthermore, each pressure gauge has a defined operating range (often 1:10) resulting in a relatively small operating range of the venturi flow meter (1:3). The selection of pressure gauges for downhole use therefore requires a good understanding of possible variations of the expected downhole pressures and pressure drops ($\Delta p$) throughout the life time of the well.

There is a need to avoid or alleviate the limitations associated with the conventional $\Delta p$ measuring method.

Furthermore there is a need for a method and system for monitoring fluid flow at multiple points in a conduit in a cost effective manner, without the need to install pressure gauges and other associated costly equipment.

SUMMARY OF THE INVENTION

In accordance with the invention there is provided a method for monitoring fluid flow in a conduit, the method comprising:
  acoustically coupling an optical fiber to the conduit adjacent to a flow restriction in the conduit;
  inducing a Distributed Acoustic Sensing (DAS) assembly to measure an acoustic noise signature generated in the optical fiber by the fluid flowing through the flow restriction;
  deriving the fluid flow rate of the fluid flowing through the flow restriction from the measured acoustic noise signature; and
  displaying the derived fluid flow rate at a fluid flow rate monitoring display.

The fluid flow rate Q may be derived from the measured acoustic noise signature SNR following empirical correlations of McKinley et. al., which require a multi-rate test to determine a number of calibration parameters that depend on the number of flow restrictions.

The empirical correlations of McKinley et. al. optionally comprise the formula:

$$SNR = A + B \cdot Q^N,$$

wherein A, B and N are the empirically determined calibration parameters, which may be determined by a flow test using a multi-rate production test wherein the gas and liquid production is measures at surface by means of a test separator or multiphase flowmeter, or wherein a production logging tool is inserted in the conduit in the vicinity of the flow restriction and the fluid flow rate Q through the flow restriction is varied and measured by the production logging tool while the acoustic noise signature SNR is measured by the optical fiber and DAS interrogator assembly.

In a multiphase fluid mixture, such as a two-phase flow, the fluid flow rates of the individual phases may be derived from the acoustic noise signatures (SNR) measured across two consecutive flow restrictions with different flow resistivities, such as flow venturi's with different Outer/Inner Diameter (OD/ID) ratios (Beta's). From two known multiphase flow equations, two individual flow parameters may be derived, such as gas and liquid flowrates in gas/liquid mixtures, and water and oil flowrates in oil/water mixtures.

The optical fiber and DAS assembly may be induced to measure the acoustic noise signature SNR of acoustic signals within different frequency bands ranging from 1-10, 10-200, 200-2000 or 2000-5000 Hz transmitted by the fluid flow through the flow restriction to the optical fiber.

In accordance with the invention there is furthermore provided a system for monitoring fluid flow in a conduit, the system comprising:
  an optical fiber which is acoustically coupled to an outer surface of the conduit adjacent to a flow restriction in the conduit;
  a Distributed Acoustic Sensing (DAS) assembly which is configured to measure an acoustic noise signature generated in the fiber by the fluid flowing through the flow restriction; and
  a fluid flow monitoring display for displaying the fluid flow rate of the fluid flowing through the flow restriction derived from the measured acoustic noise signature.

The system may further comprise a computer readable medium, which when connected to a computer, causes the computer to derive the fluid flow rate Q from the measured acoustic noise signature SNR following empirical correlations of McKinley et. al., which correlate a number of calibration parameters that depend on the number of flow restrictions.

The empirical correlations of McKinley et. al. may comprise using the formula:

$$SNR = A + B \cdot Q^N,$$

wherein A, B and N are the empirically determined calibration parameters.

The conduit may be a hydrocarbon fluid transportation conduit arranged within or connected to a hydrocarbon fluid production well or a fluid injection conduit connected to or arranged in a fluid injection well through which fluid is injected into a hydrocarbon fluid containing formation.

A plurality of flow restrictions with different flow resistivities may be arranged along at least part of the length of the conduit and the flow restrictions may be arranged in a production tubing downstream of a production zone or in a fluid injection tubing upstream of an injection zone of a well to measure the amount of fluid produced from or injected into the formation in that zone.

These and other features, embodiments and advantages of the method and system according to the invention are described in the accompanying claims, abstract and the following detailed description of non-limiting embodiments depicted in the accompanying drawings, in which description reference numerals are used which refer to corresponding reference numerals that are depicted in the drawings.

Similar reference numerals in different figures denote the same or similar objects.

DETAILED DESCRIPTION OF THE DEPICTED EMBODIMENTS

Figure 1:
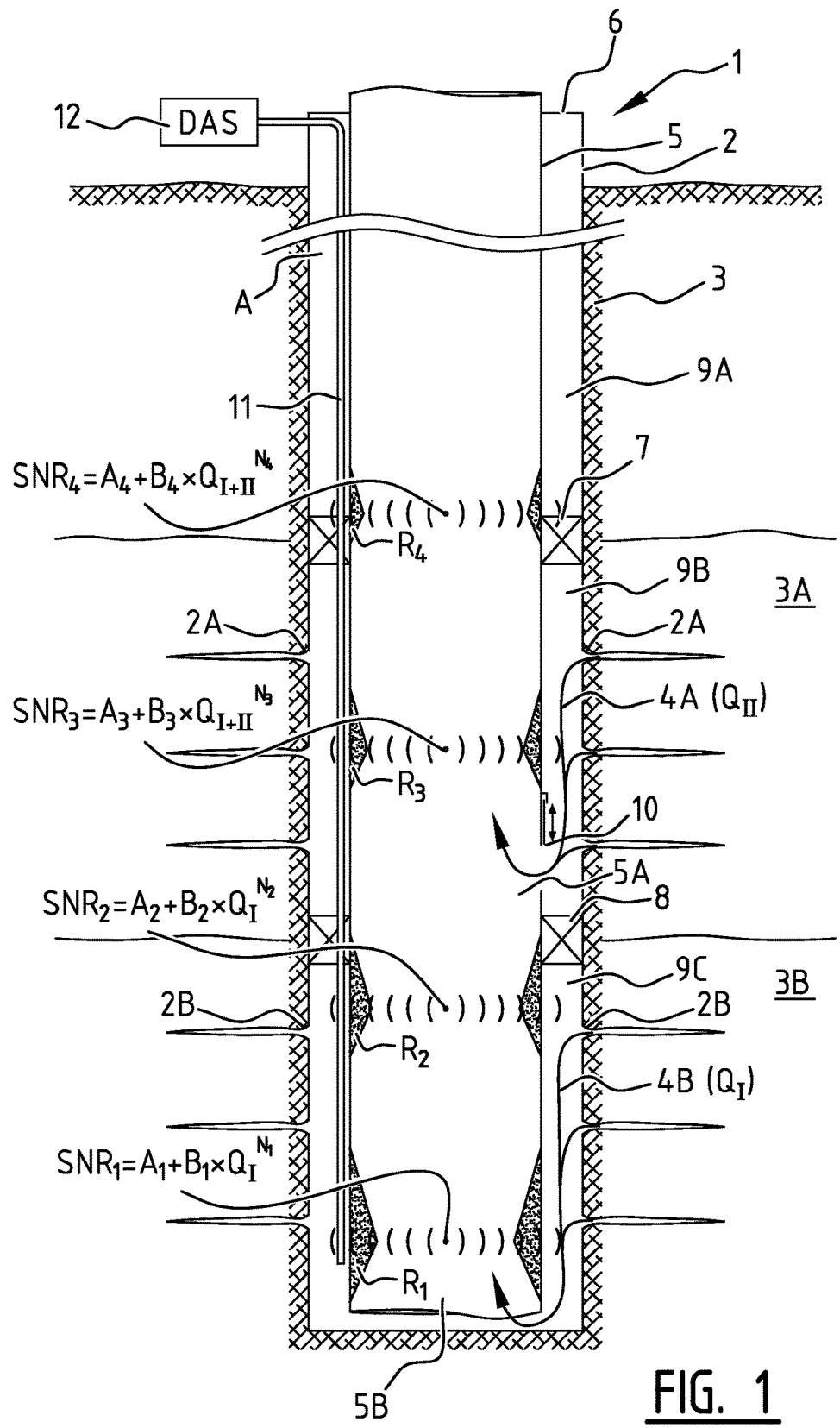
FIG. 1 is a schematic longitudinal sectional view of a inflow region of a well in which fluid flow is monitored using the method and system according to the invention.

FIG. 1 is a schematic longitudinal sectional view of an oil and/or gas production well 1.
The well 1 comprises a well casing 2 which is cemented within a surrounding subsurface earth formation 3. The formation 3 comprises two oil and/or gas bearing layers 3A and 3B and the well casing 2 is perforated by an upper assembly of perforations 2A and a lower assembly of perforations 2B to facilitate influx of crude oil and/or natural gas from these layers 3A and 3B into the interior of the well 1, as illustrated by arrows 4A and 4B.

A production tubing 5 is suspended from a wellhead 6 into the well 1 and is sealingly connected to the well casing 2 by a pair of packers 7 and 8 that are located adjacent to the upper rims of the oil and/or gas bearing formation layers 3A and 3B, so that an annular space 9 between the production tubing 5 and well casing 2 is divided into an upper annular space 9A, an intermediate annular space 9B and a lower annular space 9C.

Crude oil and/or natural gas is permitted to flow from the lower crude oil and/or natural gas bearing formation layer 3B via the lower assembly of perforations 2B, the lower annular space 9C and the open lower end of the production tubing 5 into a lower section 5B of the interior of the production tubing 5, as illustrated by arrow 4B.

Crude oil and/or natural gas is permitted to flow from the upper crude oil and/or natural gas bearing formation layers 3A via the upper assembly of perforations 2A, the intermediate annular space 9B and a sliding sleeve valve 10 into an upper section 5A of the interior of the production tubing 5.

A pair of lower venturi flow restrictions R1 and R2 is arranged in the lower section 5B of the interior of the production tubing 5 below the sliding sleeve valve 10 and a pair of upper venturi flow restrictions R3 and R4 is arranged in the upper section 5A of the interior of the production tubing 5 above the sliding sleeve valve 10.

Figure 2:
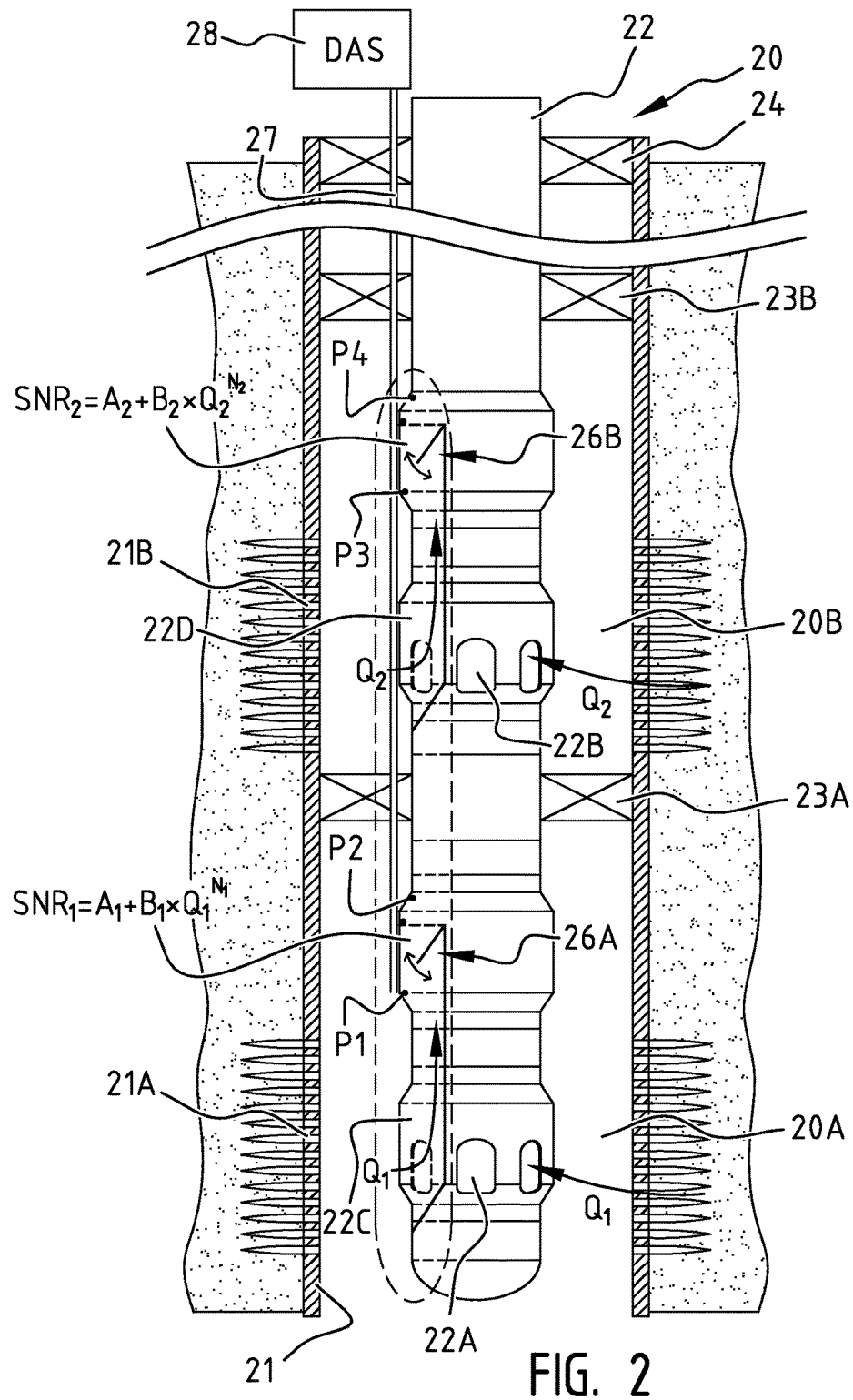
FIG. 2 is a schematic side and partial longitudinal sectional view of a well in which pressure drop and fluid influx is monitored using the conventional ΔP method and the method according to the invention.

FIG. 2 shows an oil and/or gas production well 20 with two inflow zones 20A and 20B into which crude oil and/or natural gas flows through perforated sections 21A-B of a well casing 21 into the well interior in which a production tubing 22 is suspended from a wellhead 24, whilst the lower region of the well interior is separated by packers 23 A and B into the two well inflow zones 20 A & B.

In each well inflow zone 20 A and 20B the production tubing 22 comprises a perforated section 22A, 22B which is connected to an annulus 22C, 22D surrounding the interior of the production tubing 22 that contains an annular Inflow Control Valve (ICV) 26A, 26B. Each annular ICV 26A, 26B forms a flow restriction for the flux of well effluents Q1, Q2 passing through the annuli 22C,22D into other parts of the interior of the production tubing 22.

The fluid passing through each ICV 26A, 26B generates noise ($SNR_1$ and $SNR_2$) that is monitored by acoustically coupling an optical fiber 27 to each ICV 26A, 26B. The fiber 27 is connected to a Distributed Acoustic Sensing (DAS) assembly 28, which transmits light pulses through the optical fiber 27 and measures strain variations along the length of the fiber 27 generated by the noise $SNR_1$ and $SNR_2$ (Decibel) on the basis of time-of flight and Raleigh wavelength variations of backscattered light pulses. Subsequently the fluid flow rate Q ($M^3/S$) passing through the interior of each ICV 26A, 26B is derived from the measured acoustic noise signature SNR following empirical correlations of McKinley et. al., which require a multi-rate test to determine a number of calibration parameters that depend on the number of flow restrictions. The empirically determined calibration parameters may be determined by a multi-rate production test wherein the gas and liquid production is measured at surface by means of a test separator or multiphase flowmeter.

In the embodiment shown in FIG. 2 the empirical correlations of McKinley et. al. comprise the formula:

$$SNR_i = A_i + B_i \cdot Q_i^{N_i},$$

wherein $A_i$, $B_i$ and $N_i$ are empirically determined calibration parameters, which may be determined for each ICV 26A and 26B by inserting a Production Logging Tool (PLT) into the tubing 22 to monitor the flow rates $Q_1$ and $Q_2$ and then stepwise varying each of the flowrates $Q_1$ and $Q_2$ whilst simultaneously monitoring variations of the acoustic noise rates $SNR_1$ and $SNR_2$ adjacent to each of the ICVs 26A and 26B by means of the optical fiber 28 and DAS assembly 27.

Accordingly the acoustic noise $SNR_1$ measured at the lower Inflow Control Valve ICV 26A is $SNR_1 = A_1 + B_1 \cdot Q_1^{N_1}$, wherein $A_1$, $B_1$ and $N_1$ are empirically determined calibration parameters and the acoustic noise $SNR_2$ measured at the upper Inflow Control Valve ICV 26B is $SNR_2 = A_2 + B_2 \cdot Q_2^{N_2}$, wherein $A_2$, $B_2$ and $N_2$ are empirically determined calibration parameters. In the embodiment shown in FIG. 2, two pairs of pressure gauges P1&P2 and P3&P4 are arranged in the production tubing 22 to measure the pressure drop across each ICV 26A-26B (i.e. the difference between the annular and tubing pressure) to determine the fluid inflow rate Q through each ICV 26A-26B in parallel to the fluid flow rate measurement using the fiber optical cable 27 and DAS assembly according to the invention.

Figure 3:
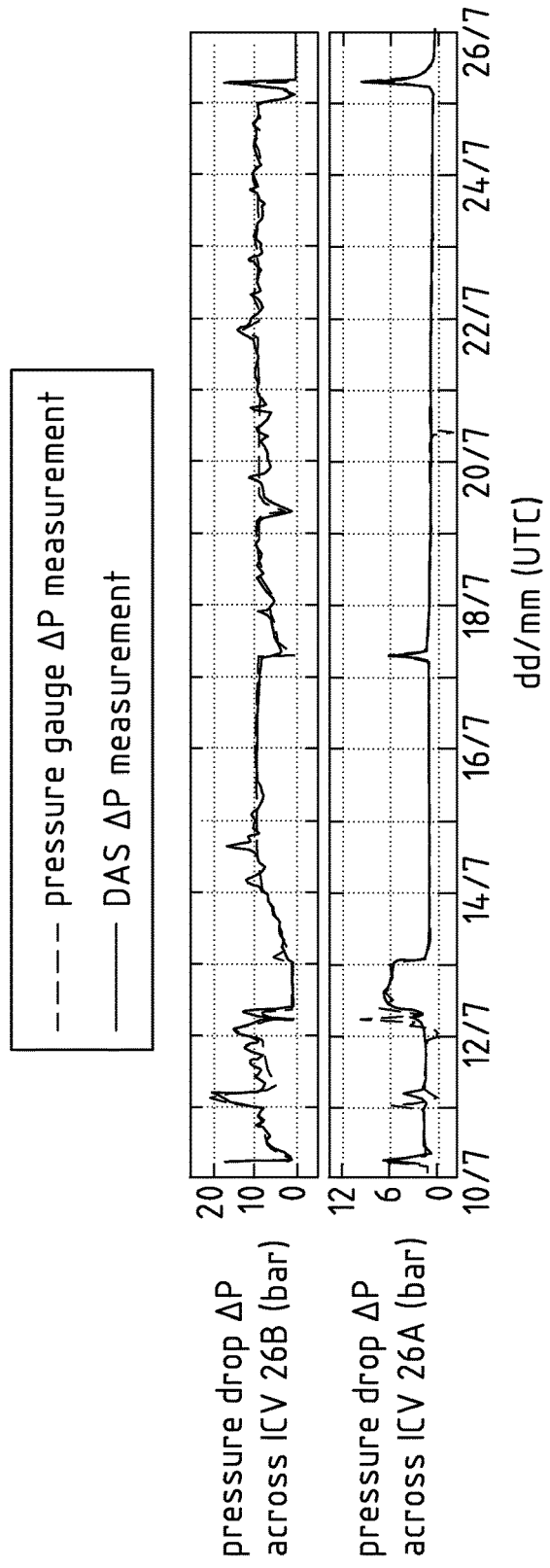
FIG. 3 shows a comparison of the pressure drop measured in the well shown in FIG. 2 using the conventional ΔP method and the method according to the invention.

FIG. 3 shows results of comparisons of fluid flow rate measurements using the conventional pressure drop (ΔP) method and the acoustic noise measuring method (DAS) according to the invention.

The graphs show comparisons of Δp measurements using the conventional Δp method, wherein the pressure drop across each ICV 26A,26B is measured using the pressure gauges P1&P2 and P3&P4 and the acoustic noise (SNR) measurement according to the invention, wherein the acoustic noise SNR at or near each ICV 26A,26B is measured, which comparisons indicate that there is an accurate match of the flow measurements using acoustic noise (SNR) method according to the invention with those using the conventional Δp measuring method.

The conventional Δp measuring method is commonly used to measure fluid flow rates Q passing through flow restrictions, such as Orifices, Venturi's and Inflow Control Valves on the basis of well-known pressure flow rate relationships, such as Bernouilli's law.

A disadvantage of the use of conventional pressure gauges P1-P4 is that they are expensive pieces of equipment that have a limited operating range (1:10), and that are difficult to install, calibrate and inspect at remote locations, such as downhole in oil and/or gas production wells or in water, steam and/or other fluid injection wells.

In the method and system according to the invention only an optical fiber 27 is installed downhole in the well, so that the Δp and associated fluid flow measurements can be performed in a more cost effective manner than with the conventional Δp method.

Further advantages of the method and system according to the invention are that DAS is extremely sensitive in picking up thermal and acoustic noise, allowing a small beta (large inner diameter of the venturi and low pressure drop) offering no objection for well intervention tools like Production Logging Tools. Secondly, the DAS measurement is a direct and single measurement from which the flowrate can be derived. Thirdly, the dynamic range of DAS is very large, large enough to cover the full range of Delta-P's. Fourthly, only a single optical fibre is required on which (an almost unlimited number of) venturi-meters can be multi-dropped. Fifthly, the combination of two venturi's in series and associated sensitive DAS assemblies may reveal information about gross and WC (watercut) and or the GVF (Gas-Volume-Fraction) in a multiphase flow in downhole well tubings and/or other multiphase fluid transportation tubulars.

The invention claimed is:

1. A method for monitoring fluid flow in a conduit, the method comprising:
    acoustically coupling an optical fiber to the conduit adjacent to a flow restriction in the conduit;
    inducing a Distributed Acoustic Sensing (DAS) assembly to measure an acoustic noise signature generated in the optical fiber by the fluid flowing through the flow restriction;
    deriving the fluid flow rate of the fluid flowing through the flow restriction from the measured acoustic noise signature; and
    displaying the derived fluid flow rate at a fluid flow rate monitoring display.

2. The method of claim 1, wherein the fluid flow rate Q is derived from the measured acoustic noise signature SNR following empirical correlations of McKinley, which correlate a number of empirical calibration parameters that depend on the number of flow restrictions.

3. The method of claim 2, wherein the empirical correlations of McKinley comprise the formula:

$$SNR = A + B \cdot QN,$$

wherein A, B and N are empirically determined calibration parameters.

4. The method of claim 2, wherein the empirically determined calibration parameters A, B and N and other empirical calibration parameters are determined by a multi-rate production test wherein the gas and liquid production is measures at surface by means of a test separator or multiphase flowmeter, or by a flow test wherein a production logging tool is inserted in the conduit in the vicinity of the flow restriction and the fluid flow rate Q through the flow restriction is varied and measured by the production logging tool while the acoustic noise signature SNR is measured by the optical fiber and DAS interrogator assembly.

5. The method of claim 2, wherein the optical fiber and DAS assembly are induced to measure the acoustic noise signature SNR of acoustic signals in different frequency bands of 1-10, 10-200, 200-2000 and 2000-5000 Hz transmitted by the fluid flow through the flow restriction to the optical fiber.

6. The method of claim 1, wherein the conduit is a hydrocarbon fluid transportation conduit arranged within or connected to a hydrocarbon fluid production well or a fluid injection conduit connected to or arranged in a fluid injection well through which fluid is injected into a hydrocarbon fluid containing formation.

7. The method of claim 6, wherein the conduit is arranged downhole in the hydrocarbon fluid production well or in the fluid injection well.

8. The method of claim 7, wherein a plurality of artificial flow restrictions, such as venturi-inserts, are arranged along at least part of the length of the conduit.

9. The method of claim 8, wherein the flow restrictions have different flow resistivities.

10. The method of claim 8, wherein the flow restrictions are arranged downstream of a production zone or upstream of an injection zone of the well and the method is used to measure the amount of fluid produced from or injected into the formation in that zone.

11. A system for monitoring fluid flow in a conduit, the system comprising:
    an optical fiber which is acoustically coupled to an outer surface of the conduit adjacent to a flow restriction in the conduit;
    a Distributed Acoustic Sensing (DAS) assembly which is configured to measure an acoustic noise signature generated in the fiber by the fluid flowing through the flow restriction; and
    a fluid flow monitoring display for displaying the fluid flow rate of the fluid flowing through the flow restriction derived from the measured acoustic noise signature.

12. The system of claim 11, wherein the system further comprises a computer readable medium, which when connected to a computer, causes the computer to derive the fluid flow rate Q from the measured acoustic noise signature SNR using the formula:

$$SNR = A + B \cdot QN,$$

wherein A, B and N are empirically determined calibration parameters.

13. The system of claim 11, wherein the conduit is a hydrocarbon fluid transportation conduit arranged within or connected to a hydrocarbon fluid production well or a fluid injection conduit connected to or arranged in a fluid injection well through which fluid is injected into a hydrocarbon fluid containing formation.

14. The system of claim 13, wherein the conduit is a well tubing arranged downhole in the hydrocarbon fluid production well or in the fluid injection well.

15. The system of claim 14, wherein at least two flow restrictions with different flow resistivities are arranged in the well tubing downstream of each production zone or upstream of each injection zone of the well and the system is configured to measure the amount of fluid produced from or injected into the formation in that zone.

\* \* \* \* \*